United States Patent
Takagi et al.

(10) Patent No.: US 8,828,557 B2
(45) Date of Patent: Sep. 9, 2014

(54) HIGH STRENGTH GALVANIZED STEEL SHEET HAVING EXCELLENT FORMABILITY, WELDABILITY, AND FATIGUE PROPERTIES AND METHOD FOR MANUFACTURING THE SAME

(75) Inventors: Shusaku Takagi, Tokyo (JP); Kohei Hasegawa, Tokyo (JP)

(73) Assignee: JFE Steel Corporation (JP)

( * ) Notice: Subject to any disclaimer, the term of this patent is extended or adjusted under 35 U.S.C. 154(b) by 0 days.

(21) Appl. No.: 13/264,006

(22) PCT Filed: Apr. 27, 2010

(86) PCT No.: PCT/JP2010/057845
§ 371 (c)(1),
(2), (4) Date: Oct. 12, 2011

(87) PCT Pub. No.: WO2010/126161
PCT Pub. Date: Nov. 4, 2010

(65) Prior Publication Data
US 2012/0040203 A1 Feb. 16, 2012

(30) Foreign Application Priority Data

Apr. 28, 2009 (JP) .................................. 2009-109735
Feb. 24, 2010 (JP) .................................. 2010-038216

(51) Int. Cl.
*B32B 15/18* (2006.01)
*C22C 38/18* (2006.01)
*C21D 7/00* (2006.01)
*B32B 15/01* (2006.01)
*C21D 9/46* (2006.01)
*C21D 8/04* (2006.01)
*C23C 2/02* (2006.01)
*C22C 38/00* (2006.01)
*C23C 2/28* (2006.01)
*C22C 38/26* (2006.01)
*C22C 38/02* (2006.01)
*C22C 38/32* (2006.01)
*C22C 38/06* (2006.01)
*C23C 2/06* (2006.01)
*C22C 38/38* (2006.01)
*C21D 9/48* (2006.01)
*C22C 38/28* (2006.01)

(52) U.S. Cl.
CPC ................. *C23C 2/02* (2013.01); *B32B 15/013* (2013.01); *C21D 2211/008* (2013.01); *C21D 9/46* (2013.01); *C21D 8/0426* (2013.01); *C21D 8/0473* (2013.01); *C21D 8/0463* (2013.01); *C22C 38/001* (2013.01); *C23C 2/28* (2013.01); *C22C 38/26* (2013.01); *C22C 38/02* (2013.01); *C22C 38/32* (2013.01); *C22C 38/06* (2013.01); *C21D 8/0405* (2013.01); *C21D 2211/005* (2013.01); *C23C 2/06* (2013.01); *C21D 2211/002* (2013.01); *C22C 38/38* (2013.01); *C21D 9/48* (2013.01); *C22C 38/28* (2013.01)
USPC ............ 428/659; 420/104; 420/115; 148/579

(58) Field of Classification Search
None
See application file for complete search history.

(56) References Cited

U.S. PATENT DOCUMENTS

| | | | | |
|---|---|---|---|---|
| 3,962,501 | A | * | 6/1976 | Ohbu et al. ................... 427/433 |
| 5,755,895 | A | * | 5/1998 | Tamehiro et al. ............. 148/336 |
| 2005/0217766 | A1 | * | 10/2005 | Fukuzumi et al. ............ 148/330 |

FOREIGN PATENT DOCUMENTS

| | | |
|---|---|---|
| EP | 1 367 143 A1 | 12/2003 |
| EP | 1 681 363 A1 | 7/2006 |
| JP | 2001-011538 A | 1/2001 |
| JP | 3263143 B2 | 3/2002 |
| JP | 2002-256386 A | 9/2002 |
| JP | 2002-317245 A | 10/2002 |
| JP | 2004-211140 A | 7/2004 |
| JP | 2004-232011 A | 8/2004 |
| JP | 2004-292881 A | 10/2004 |
| JP | 3596316 B2 | 12/2004 |
| JP | 2005-105367 A | 4/2005 |
| JP | 2005-220430 | 8/2005 |
| JP | 2006-063360 A | 3/2006 |
| JP | 2007-119842 | 5/2007 |
| JP | 2007-231369 | 9/2007 |
| JP | 2008-156734 | 7/2008 |
| JP | 2008-280608 A | 11/2008 |
| WO | 2008/133062 A1 | 11/2008 |

OTHER PUBLICATIONS

English Machine Translation of Takagi et al., JP2008-280608, printed Oct. 11, 2013.*
Yoshinaga et al. JP 2005-105367, English Machine Translation Dated Feb. 25, 2014.*

* cited by examiner

*Primary Examiner* — Adam Krupicka
(74) *Attorney, Agent, or Firm* — DLA Piper LLP (US)

(57) ABSTRACT

A high strength galvanized steel sheet including all in mass %, C: 0.05% to <0.12%, Si: 0.35% to <0.80%, Mn: 2.0 to 3.5%, P: 0.001 to 0.040%, S: 0.0001 to 0.0050%, Al: 0.005 to 0.1%, N: 0.0001 to 0.0060%, Cr: 0.01% to 0.5%, Ti: 0.010 to 0.080%, Nb: 0.010 to 0.080%, and B: 0.0001 to 0.0030%, optionally one or more of Mo: 0.01 to 0.15%, Ca: 0.0001 to 0.0050%, REM: 0.0001 to 0.1%, and Sb: 0.0001 to 0.1%, and Fe and unavoidable impurities as the balance, has a microstructure containing a ferrite phase with a volume fraction in a range of 20 to 70% and an average grain diameter equal to or smaller than 5 μm, and has a galvanized layer on a surface thereof at a coating weight (per side) of 20 to 150 g/m².

18 Claims, No Drawings

HIGH STRENGTH GALVANIZED STEEL SHEET HAVING EXCELLENT FORMABILITY, WELDABILITY, AND FATIGUE PROPERTIES AND METHOD FOR MANUFACTURING THE SAME

RELATED APPLICATIONS

This is a §371 of International Application No. PCT/JP2010/057845, with an international filing date of Apr. 27, 2010 (WO 2010/126161 A1, published Nov. 4, 2010), which is based on Japanese Patent Application Nos. 2009-109735, filed Apr. 28, 2009, and 2010-038216, filed Feb. 24, 2010, the subject matter of which is incorporated by reference.

TECHNICAL FIELD

This disclosure relates to a high strength galvanized steel sheet having excellent formability, weldability, and fatigue properties and a tensile strength (TS) equal to or higher than 980 MPa and thus suitable for use in automobile and other components that need be pressed into shapes difficult to make, and also to a method for manufacturing such a steel sheet.

It should be noted that "galvanized steel sheets" includes those alloyed by heat treatment after galvanization, namely alloyed galvanized steel sheets.

BACKGROUND

High-strength galvanized steel sheets for automobile and other components are required to have excellent formability in addition to high strength for the character of their applications.

Recently, high strength steel sheets have been demanded in manufacturing of automobile bodies as measures to improve fuel efficiency by reducing the weight of car bodies while ensuring crashworthiness and, thus, have increasingly been used. Although their main field had been simple processing, applying this type of steel sheet to components having complicated shapes has recently been considered.

In general, however, formability of steel sheets decreases as their strength increases. Thus, one of the most serious problems with the use of high strength steel sheets is fracturing during press molding. There is thus demand for stretch flangeability and other formability characteristics to be improved as required by the shape of the component. For steels having a strength as high as 980 MPa or more, bendability is also important, particularly because parts made from this type of steel are more often processed by bending.

Furthermore, excellent weldability is also essential in addition to formability because shaped steel sheets are subjected to resistance spot welding during assembly.

Moreover, components having a reduced thickness should have better bending-fatigue properties than ever in some areas thereof.

As solutions to satisfy these requirements, for example, Japanese Unexamined Patent Application Publication Nos. 2004-232011, 2002-256386, 2002-317245 and 2005-105367, Japanese Patent Nos. 3263143 and 3596316 and Japanese Unexamined Patent Application Publication Nos. 2001-11538 and 2006-63360 disclose methods of obtaining a high-formability and high strength galvanized steel sheet by limiting the composition and microstructure of steel and optimizing hot-rolling and annealing conditions.

Of the patent publications, JP '011 discloses a TS 980 MPa-class steel containing large amounts of C and Si, but does not regard stretch flangeability and bendability.

JP '386, JP '245 and JP '367 disclose steels containing Cr, but also pay no attention to flangeability and bendability.

In JP '143, JP '316 and JP '538, which mention hole expansion ratio $\lambda$, a measure for evaluating stretch flangeability, the tensile strength (TS) is lower than 980 MPa. Furthermore, these publications make no mention of bendability and fatigue properties.

JP '360 mentions improvement of bendability by the addition of Ti and improvement of notch fatigue properties by a reduced ferrite grain size, but does not discuss stretch flangeability, weldability, or bending fatigue. Notch fatigue properties are an evaluation measure of fatigue breakdowns occurring from perforations for bolting and attaching fixtures. Bending fatigue properties are fatigue properties of the base material itself, which is the main ingredient of finished components. These two kinds of properties are quite different in that for perforations, the status of cracks that occur at perforation greatly contributes to the fatigue properties, the fatigue in smooth areas greatly depends on the microstructure and composition of the base material.

It could therefore be helpful to provide a high strength galvanized steel sheet having excellent formability, weldability, and fatigue properties and a tensile strength as high as TS 980 MPa together with an advantageous method for manufacturing it.

SUMMARY

We Found the Following:

(1) From the viewpoints of formability and weldability, the amounts of C, P, and S should be reduced.

(2) A favorable surface quality can be achieved only when the amount of Si is kept low.

(3) Regarding a decreased strength associated with the reduced amounts of C and P, the strength can be improved using Cr, Si, and Mn even with small amounts of alloy elements.

(4) A microstructure having a ferrite phase with a volume fraction of 20 to 70% and an average grain diameter equal to or smaller than 5 µm improves formability and weldability.

(5) In addition to (4), bainite and/or martensite having an average grain diameter equal to or smaller than 5 µm provides favorable bendability.

(6) During the process of microstructure control according to (5), adding a large amount of Cr leads to impaired fatigue properties, but the addition of Si improves the fatigue properties.

We Thus Provide:

[1] A high strength galvanized steel sheet having excellent formability, weldability, and fatigue properties, having: a composition of C: 0.05% to <0.12%, Si: 0.35% to <0.80%, Mn: 2.0 to 3.5%, P: 0.001 to 0.040%, S: 0.0001 to 0.0050%, Al: 0.005 to 0.1%, N: 0.0001 to 0.0060%, Cr: 0.01% to 0.5%, Ti: 0.010 to 0.080%, Nb: 0.010 to 0.080%, and B: 0.0001 to 0.0030% all in mass %, and Fe and unavoidable impurities as the balance; a microstructure containing a ferrite phase with a volume fraction of 20 to 70% and an average grain diameter equal to or smaller than 5 µm; a tensile strength equal to or higher than 980 MPa; and a galvanized layer on a surface thereof at a coating mass (per side): 20 to 150 g/m².

[2] A high strength galvanized steel sheet having excellent formability, weldability, and fatigue properties, having:

a composition of C: 0.05% to <0.12%, Si: 0.35% to <0.80%, Mn: 2.0 to 3.5%, P: 0.001 to 0.040%, S: 0.0001 to 0.0050%, Al: 0.005 to 0.1%, N: 0.0001 to 0.0060%, Cr: 0.01% to 0.5%, Ti: 0.010 to 0.080%, Nb: 0.010 to 0.080%, and B: 0.0001 to 0.0030% all in mass %, and Fe and unavoidable impurities as the balance; a microstructure composed of a ferrite phase with a volume fraction of 20 to 70% and an average grain diameter equal to or smaller than 5 μm and of bainite and/or martensite with retained austenite and pearlite at a total of 5% and an average grain diameter equal to or smaller than 5 μm; a tensile strength equal to or higher than 980 MPa; and a galvanized layer on a surface thereof at a coating weight (per side): 20 to 150 g/m$^2$.

[3] The high strength galvanized steel sheet having excellent formability, weldability, and fatigue properties according to [1] or [2], wherein the steel further contains Mo: 0.01 to 0.15% in mass %.

[4] The high strength galvanized steel sheet having excellent formability, weldability, and fatigue properties according to any one of [1] to [3], wherein the steel further contains Ca: 0.0001 to 0.0050% and/or REM: 0.0001 to 0.1% both in mass %.

[5] The high strength galvanized steel sheet having excellent formability, weldability, and fatigue properties according to any one of [1] to [4], wherein the steel further contains Sb: 0.0001 to 0.1% in mass %.

[6] A method for manufacturing a high strength galvanized steel sheet having excellent formability, weldability, and fatigue properties by hot-rolling, coiling, pickling, cold-rolling, and then galvanizing a steel slab having the composition according to any one of [1] to [5], including: hot-rolling the slab at a slab-heating temperature of 1150 to 1300° C. and a finish hot-rolling temperature of 850 to 950° C. and then cooling down in a temperature range from the finish hot-rolling temperature to (the finish hot-rolling temperature—100° C.) at an average cooling rate: 5 to 200° C./second; coiling the hot-rolled steel sheet at a temperature of 400 to 650° C.; pickling the hot-rolled steel sheet; cold rolling the pickled hot-rolled steel sheet; heating the cold-rolled steel sheet to an intermediate temperature of 500 to 800° C. at a first average heating rate, the heating rate for heating from 200° C. to the intermediate temperature of 5 to 50° C./second, further heating to an annealing temperature of 730 to 900° C. at a second average heating rate, the heating rate for heating from the intermediate temperature to the annealing temperature of 0.1 to 10° C./second, holding in this annealing temperature range for 10 to 500 seconds, and then cooling to a temperature of 450 to 550° C. at an average cooling rate of 1 to 30° C./second; galvanizing the steel sheet; and then optionally alloying the galvanized steel sheet.

We make it possible to manufacture a high strength galvanized steel sheet having a high strength and excellent formability, weldability, and fatigue properties. Our high strength galvanized steel sheets satisfy both strength and formability requirements for automobile components and, thus, are suitable for use as automobile components to be pressed into shapes difficult to make.

Excellent formability means that the following conditions are all satisfied: TS×El=13000 MPa·%; TS×λ≥20000 MPa·%; the bending limit at a 90° V-shaped bend≤1.5t (t: thickness of the sheet). Similarly, excellent weldability means that the base material fractures at a nugget diameter: 4√t (mm) or larger (t: thickness of the steel sheet), excellent fatigue properties mean that the endurance ratio at the bending fatigue limit (the stress at the fatigue limit/TS)≥0.42 is satisfied, and high strength means that the tensile strength (TS) is equal to or higher than 980 MPa.

DETAILED DESCRIPTION

The following describes our steel sheets and methods in more specific terms.

First, an explanation is given about why the composition of the steel sheet and the steel slab is limited by the ranges specified above. Note that the "%" values linked with the individual elements represent mass % values unless otherwise specified.

C: 0.05% to <0.12%

The strength of a martensite phase is usually proportional to the amount of C, and thus C is an element essential to reinforce steel using a martensite phase. A TS equal to or higher than 980 MPa can be obtained only when C is contained in an amount of 0.05% or more, and the TS increases as the amount of C increases. When the C content is equal to or higher than 0.12%, however, spot weldability is seriously low, and bendability and other formability characteristics are also seriously low in many cases because of an increased hardness due to the increased amount of the martensite phase and formation of a retained austenite phase harder than the martensite phase. The C content is thus limited to a range of 0.05% to <0.12%. Preferably, it is less than 0.105%. From the viewpoint that a TS equal to or higher than 980 MPa should be consistently achieved, however, a preferred C content is equal to or higher than 0.08%.

Si: 0.35% to <0.80%

Si is an element that contributes to improved strength through solute strengthening, and also improves bending fatigue properties, ductility, and weldability. Si has its effect when contained in an amount of 0.35% or more. When contained in an amount of 0.80% or more, however, Si forms persistent scale during the hot-rolling process, leading to a degraded surface quality of the steel sheet as well as reduced formability and impaired fatigue properties. In such a case, furthermore, Si is concentrated on the surface of the steel sheet in the form of oxides and causes incomplete galvanization. The Si content is thus limited to a range of 0.35% to <0.80%. It is preferably 0.35% to 0.60%, and more preferably equal to or lower than 0.50%.

Mn: 2.0 to 3.5%

Mn effectively contributes to improvement in strength and has this effect when contained in an amount of 2.0% or more. When an excessive amount of Mn is present and its content exceeds 3.5%, however, it leads to a microstructure having different transformation temperature from area to area due to the segregation of Mn and other causes, resulting in a non-uniform microstructure containing band-like ferrite and martensite phases, and formability is reduced. In such a case, furthermore, Mn is concentrated on the surface of the steel sheet in the form of oxides and causes the galvanization process to fail. Mn content is thus limited to 2.0% to 3.5%. Preferably, it is 2.2% to 2.8%.

P: 0.001 to 0.040%

P is an element that contributes to the improvement of strength but, on the other hand, it is an element that impairs weldability, and its influence is significant when the P content exceeds 0.040%. The P content should be reduced to 0.02% particularly when Cr is added more than 0.5%. However, a P content up to 0.040% is acceptable when Cr is added in an amount of 0.5% or less. But, an excessive reduction of P is associated with an increased manufacturing cost in the steelmaking process. The P content is thus limited to 0.001% to 0.040%. It is preferably 0.001% to 0.025%, and more preferably 0.001% to 0.015%.

S: 0.0001 to 0.0050%

An increased amount of S causes hot shortness and may have negative influence on the manufacturing process. Furthermore, S forms an inclusion MnS, and this inclusion persists in the form of a plate even after the cold-rolling process, particularly reducing the limit deformability of the material as well as affecting stretch flangeability and other formability characteristics. No problem will arise with the S content up to 0.0050%. However, an excessive reduction is associated with an increased desulfurization cost in the steelmaking process. The S content is thus limited to 0.0001% to 0.0050%. Preferably, it is 0.0001% to 0.003%.

Al: 0.005 to 0.1%

Al is an element that works as an effective deoxidizer during the steelmaking process and is also useful in isolating nonmetal inclusions which may locally reduce elongation into slag. During the annealing process, furthermore, Al has the effect of preventing oxides of Mn and Si from forming in the superficial layer and affecting wettability and, thus, improves the appearance of the coating surface. These effects can be obtained only when Al is added in an amount of 0.005% or more. When Al is added in more than 0.1%, however, it causes an increased cost of the ingredients of the steel as well as a reduced weldability. The Al content is thus limited to 0.005 to 0.1%. Preferably, it is 0.01% to 0.06%.

N: 0.0001 to 0.0060%

In multi-phase steels, the influence of N on the material characteristics is not so great. The advantages are not reduced when the N content is equal to or lower than 0.0060%. The amount of N is desirably small from the viewpoint of improving elongation through the cleanliness of ferrite, but a reduced amount of N leads to an increased steelmaking cost, and thus the lower limit is 0.0001%. The N content is therefore 0.0001% to 0.0060%.

Cr: 0.01 to 0.5%

Cr is an element effective in hardening steel by quenching and this effect can be obtained only when Cr is added in an amount of 0.01% or more. In addition to this, Cr improves the hardenability of austenite and thereby effectively contributes to the improvement of ductility and bendability. When added in a large amount, however, Cr reduces fatigue properties and weldability by its low potential of solute strengthening. When the Cr content exceeds 0.5%, fatigue properties are affected and weldability is reduced. The Cr content is thus limited to 0.01 to 0.5%. More preferably, it is equal to or lower than 0.3%.

Ti: 0.010 to 0.080%

Ti binds to C or N in steel to form fine particles of carbides and nitrides and thereby effectively acts to provide a microstructure of hot-rolled steel sheets and of annealed steel sheets with a reduced grain diameter and the potential of precipitation strengthening. This effect can be obtained only with Ti at 0.010% or more. However, increasing the Ti content beyond 0.080% does not bring about a correspondingly greater effect and, to make matters worse, causes formation of an excessive amount of precipitates in ferrite and leads to a reduced elongation of ferrite. The Ti content is thus limited to 0.010 to 0.080%. More preferably, it is 0.020 to 0.060%.

Nb: 0.010 to 0.080%

Nb is an element that contributes to the improvement of strength through solute strengthening or precipitation strengthening. In addition, Nb has the effect of reducing difference in hardness between ferrite and martensite phases by reinforcing ferrite and thereby effectively contributes to improvement of stretch flangeability. Furthermore, Nb contributes to reduction of ferritic, bainitic, and martensitic grain diameters and thereby improves bendability. These effects are obtained when the Nb content is equal to or higher than 0.010%. When an excessive amount of Nb is contained and its content exceeds 0.080%, however, the sheet to be hot-rolled will be so hard that the hot-rolling and cold-rolling processes will require a large amount of rolling force. In such a case, furthermore, elongation of ferrite is reduced, and formability is impaired. The Nb content is thus limited to 0.010% to 0.080%. From the viewpoint of strength and formability, the Nb content is preferably 0.030 to 0.070%.

B: 0.0001 to 0.0030%

B improves hardenability and prevents ferrite from forming during the cooling process for annealing, thereby contributing to achieving a desired amount of martensite. This effect can be obtained only when the B content is equal to or higher than 0.0001%. However, any content exceeding 0.0030% does not have a correspondingly greater effect. The B content is thus limited to 0.0001 to 0.0030%. Preferably, it is 0.0005 to 0.0020%.

The steel sheet can have favorable formability, weldability, and fatigue properties only when the steel sheet has the composition described above and contains Fe and unavoidable impurities as the balance. If necessary, however, the following elements may be contained as appropriate.

Mo: 0.01 to 0.15%

Mo is an element effective in hardening steel by quenching, and this effect can be obtained only when Mo is added in an amount of 0.01% or more. When the Mo content exceeds 0.15%, however, P should be reduced so that weldability can be ensured, and the cost may be high. To make matters worse, the fatigue properties are also affected. The Mo content is thus limited to 0.01% to 0.15%. More preferably, it is 0.01 to 0.05%.

Ca: 0.0001 to 0.0050%, REM: 0.0001 to 0.1%

Ca and REM have the effect of improving elongation and stretch flangeability by controlling the shape of MnS and other sulfides. However, increasing their amounts fails to have a correspondingly greater effect. When Ca is contained, thus, its content is 0.0001% to 0.0050%, and preferably 0.0001% to 0.0020%. When REM is contained, its content is in a range of 0.0001% to 0.1%, and preferably 0.0005% to 0.01%.

Sb: 0.0001 to 0.1%

Sb acts to control the morphology of sulfide inclusions without greatly changing wettability and thereby granulates the crystals existing on the surface of the steel sheet, leading to an improved formability. When Sb is contained, its content is 0.0001% to 0.1%, and preferably 0.0005% to 0.01%.

V has the effect of reinforcing the ferrite phase by forming carbides but, on the other hand, it reduces elongation of the ferrite phase. V is thus contained preferably at less than 0.05% and more preferably at less than 0.005%.

As for other elements, Zr, Mg, and other elements that form precipitates preferably have their content reduced as much as possible and need not be actively added. Their content is lower than 0.0200% and more preferably lower than 0.0002%. Besides them, Cu and Ni are elements that affect weldability and the appearance of the coated surface, respectively, and thus the Cu content and the Ni content are individually lower than 0.4% and more preferably lower than 0.04%.

Next, the limits on steel microstructure, an important aspect, and the reasons are described.

Average Grain Diameter in the Ferrite Phase: 5 µm or Smaller

Downsized crystal grains contribute to improvement of stretch flangeability and bendability of the steel sheet. The average grain diameter of the ferrite phase in the multi-phase microstructure is limited to 5 µm or smaller so that improvement in bendability can be achieved.

When soft and hard regions form a coarse microstructure, furthermore, the steel sheet cannot be uniformly formed and thus is low in formability. In this respect, ferrite and martensite phases forming a uniform and fine microstructure allow the steel sheet to be uniformly deformed during machining processes. The average grain diameter in the ferrite phase is desirably small. For the purpose of preventing degradation of formability, it is preferably 1 to 3.5 µm.

Volume Fraction of the Ferrite Phase: 20 to 70%

The ferrite phase is a soft phase and contributes to elongation of the steel sheet. The ferrite phase should be contained at 20% or more on a volume basis. When the ferrite phase exists in more than 70%, however, the steel sheet is excessively soft and it is difficult to ensure strength. The ferrite phase content is thus 20% to 70%, and preferably 30% to 60% on a volume basis.

Bainite and/or Martensite with an Average Grain Diameter Equal to or Smaller than 5 µm Besides the ferrite phase, the untempered martensite and/or bainite phase, both of which are phases transformed from austenite at low temperatures, should have an average grain diameter equal to or smaller than 5 µm so that stretch flangeability, bendability, and fatigue properties can be further improved. The volume fraction is 30% to 80%. This martensite and/or bainite phase is a hard phase and acts to increase the strength of the steel sheet through transformation strengthening. Also, this hard phase disperses and thereby prevents fatigue cracks from running. When the average grain diameter of the martensite and/or bainite phase exceeds 5 µm, however, these effects are insufficient.

It should be noted that although we use the term grain diameter in accordance with conventional usage, it is measured with the regions corresponding to former or pre-transformation austenite grains as individual grains in practice.

The remaining portion of the microstructure, or the phases other than the ferrite, martensite, and bainite phases described above, may contain retained austenite and pearlite phases. These phases, however, do not reduce the advantages as long as their total content is equal to or lower than 5% on a volume basis.

Next, a method for manufacturing a high strength galvanized steel sheet is described.

First, molten steel adjusted to the composition described above is shaped into a slab by continuous casting or ingot casting and blooming. Then, the obtained slab is hot-rolled after being cooled and reheated or directly hot-rolled without being heated after the casting process. The hot-rolling process is performed under the following conditions: The slab-heating temperature is 1150 to 1300° C.; the finish rolling temperature is 850 to 950° C. to give the hot-rolled sheet a uniform microstructure and to improve stretch flangeability and other formability characteristics; the average cooling rate for cooling from the finish hot-rolling temperature to (the finish hot-rolling temperature—100° C.) is 5 to 200° C./second to prevent formation of a two-phase band-like microstructure composed of ferrite and pearlite phases, to result in a hot-rolled sheet a uniform microstructure, and improve stretch flangeability and other formability characteristics; and the coiling temperature is 400 to 650° C. to improve surface quality and for better behavior in the cold-rolling process. After completion of this hot-rolling process, the steel sheet is pickled and cold-rolled into a desired thickness. The cold-rolling reduction is desirably equal to or higher than 30% so that elongation can be improved through the promoted recrystallization of the ferrite phase. For improved fatigue properties, furthermore, descaling with high-pressure water is preferably performed to remove the scale that forms during the hot-rolling process.

The next process is galvanization, but prior to this, the steel sheet is subjected to the following steps so that the microstructure can be controlled during the annealing process or before the cooling process and that the final volume fraction and grain diameter of ferrite should be optimal: The steel sheet is heated at a first average heating rate, the heating rate for heating from 200° C. to an intermediate temperature of 5 to 50° C./second with the intermediate temperature set at 500 to 800° C. The steel sheet is further heated at a second average heating rate, the heating rate for heating from the intermediate temperature to an annealing temperature of 0.1 to 10° C./second with the annealing temperature set at 730 to 900° C.; the heated steel sheet is held in this temperature range for 10 to 500 seconds; and then the steel sheet is cooled at an average cooling rate for 1 to 30° C./second to a cooling stop temperature of 450 to 550° C.

After being cooled, the steel sheet is immersed in a galvanizing bath, with the zinc coating weight controlled by gas wiping or any other appropriate means, and then cooled to room temperature with or without being further heated and alloyed.

A high strength galvanized steel sheet obtained in this way may be subjected to skin-pass rolling.

The following describes the limits on manufacturing conditions and the reasons for them in more specific terms.

Slab-Heating Temperature: 1150 to 1300° C.

The precipitates existing at the time of heating the steel slab will exist as coarser precipitates and make no contribution to strength in the finished steel sheet. This means that the Ti- or Nb-based precipitates separating out during the casting process should be dissolved once again. Heating to a temperature equal to or higher than 1150° C. has proven to contribute to strength. A heating temperature equal to or higher than 1150° C. is also advantageous in the following points: Blow holes, segregation, and other defects in the superficial layer of the slab can be scaled off; cracks and unevenness on the surface of the steel sheet can be reduced; and thus the steel sheet can have a smooth surface. When the heating temperature exceeds 1300° C., however, coarse austenite grains are formed, resulting in a coarse finished microstructure and a reduced stretch flangeability. The slab-heating temperature is thus limited to 1150° C. to 1300° C.

Finish Rolling Temperature: 850 to 950° C.

A finish hot-rolling temperature equal to or higher than 850° C. leads to significantly improved formability characteristics (elongation and stretch flangeability). When the finish rolling temperature is lower than 850° C., the machined microstructure after the hot-rolling process will contain elongated crystals. When Mn, an austenite-stabilizing element, is segregated in the slab, furthermore, the relevant region has a decreased Ar3 transformation temperature and remains as an austenite region until the temperature is low. Moreover, the decrease in the transformation temperature probably results in the recrystallization-free temperature range and the rolling stop temperature falling within the same temperature range, allowing unrecrystallized austenite to exist during the hot-rolling process. In this way, a nonuniform microstructure inhibits uniform deformation of the material during machining processes and makes it difficult to achieve excellent formability.

When the finish rolling temperature exceeds 950° C., however, formation of oxides (scale) rapidly increases, ferrite-oxide boundaries get rough, and surface quality after pickling and cold-rolling processes are impaired. If unremoved hot-rolling-induced scale and other defects persist after the pickling process in some portion, furthermore, they affect resistance spot weldability, fatigue properties, and other characteristics. To make matters worse, in some cases, the grain diameter becomes excessively coarse and causes a rough surface of the pressed product during machining processes. The finish rolling temperature is thus 850 to 950° C. and preferably 900 to 950° C.

Average Cooling Rate for Cooling from the Finish Rolling Temperature to (the Finish Rolling Temperature—100° C.): 5 to 200° C./Second When the average cooling rate for the high-temperature range immediately after finish rolling [the finish rolling temperature to (the finish rolling temperature—100° C.)] falls short of 5° C./second, recrystallization and growth of grains occur after the hot-rolling process, and the microstructure of the hot-rolled sheet coarsens and turns into a band-like microstructure containing ferrite and pearlite formed in layers. If the microstructure turns into a band-like microstructure before being annealed, it will be heated with an uneven distribution of the ingredients therein, which will make it difficult to obtain a fine and uniform microstructure with heat treatment in the coating process, and the finished microstructure will be nonuniform, leading to reduced stretch flangeability and bendability. The average cooling rate for cooling from the finish rolling temperature to (the finish rolling temperature—100° C.) is thus equal to or faster than 5° C./second. However, increasing the average cooling rate for this temperature range beyond 200° C./second does not bring about a correspondingly greater effect, and thus the average cooling rate for this temperature range is 5 to 200° C./second.

Coiling Temperature: 400 to 650° C.

As for coiling temperature, a coiling temperature exceeding 650° C. causes the thickness of hot-rolling-induced scale to increase, the surface after the pickling and cold-rolling processes to be rough and uneven, and the ferritic grain diameter to coarsen, leading to reduced formability and fatigue properties. If the hot-rolling-induced scale still remains after the pickling process, furthermore, it affects resistance spot weldability. When the coiling temperature is lower than 400° C., however, the strength of the hot-rolled sheet is increased and the cold-rolling process will require an increased amount of rolling force, leading to a reduced productivity. The coiling temperature is thus 400° C. to 650° C.

First Average Heating Rate (200° C. To the Intermediate Temperature): 5 to 50° C./Second, Intermediate Temperature: 500 to 800° C., Second Average Heating Temperature (the Intermediate Temperature to the Annealing Temperature): 0.1 to 10° C./Second When the first average heating rate is slower than 5° C./second, crystal grains coarsen, leading to reduced stretch flangeability and bendability. This first average heating rate may be fast. However, increasing it beyond 50° C./second brings about nothing advantageous. The first average heating rate is thus 5 to 50° C./second. Preferably, it is 10 to 50° C./second.

When the intermediate temperature exceeds 800° C., furthermore, the grain diameter coarsens, leading to reduced stretch flangeability and bendability. The intermediate temperature may be low. However, decreasing it beyond 500° C. fails to have a correspondingly greater effect and makes little change to the finished microstructure. The intermediate temperature is thus 500 to 800° C.

When the second average heating rate is faster than 10° C./second, austenite forms slowly, the final volume fraction of ferrite will be high, making it difficult to ensure strength. When the second average heating rate is slower than 0.1° C./second, however, the grain diameter coarsens, leading to reduced ductility and bendability. The second average heating rate is thus 0.1 to 10° C./second. In addition, the upper limit of the second average heating rate is preferably lower than 10° C./second.

Annealing Temperature: 730 to 900° C., Time of Holding in this Temperature Range: 10 to 500 Seconds When the annealing temperature is lower than 730° C., the formation of austenite during the annealing process is insufficient, making it impossible to ensure strength. When the annealing temperature is higher than 900° C., however, austenite coarsens during the heating step, and the formation of the ferrite phase in the subsequent cooling process will be small, leading to a reduced ductility; furthermore, the final grain diameter will be excessively coarse, leading to reduced hole expansion ratio and bendability. The annealing temperature is thus 730° C. to 900° C., inclusive.

When the time of holding the steel sheet in this annealing temperature range is shorter than 10 seconds, furthermore, formation of the austenite phase during the annealing process is insufficient, making it difficult to ensure the strength of the steel sheet. Annealing for a long period of time, however, causes crystal grains to grow and coarsen. When the time of holding the steel sheet in the annealing temperature range specified above exceeds 500 seconds, the grain diameter of the austenite and ferrite phases coarsens during the annealing process, and the finished microstructure of the steel sheet, which will be obtained after heat treatment, will be coarse, leading to a reduced hole expansion ratio. Additionally, coarse austenite grains are unfavorable in that they cause a rough skin on the pressed product. To make matters worse, the formation of the ferrite phase during the process of cooling the steel sheet down to the cooling stop temperature will also be small, leading to a reduced ductility. The holding time is thus 10 seconds to 500 seconds, so that a finer microstructure can be achieved and that a uniform and fine microstructure can be obtained with the influence by the pre-annealing microstructure reduced. The period of the holding time is preferably in a range of 20 seconds to 200 seconds.

Average Cooling Rate for Cooling to the Cooling Stop Temperature: 1 to 30° C./Second This cooling rate plays an important role in controlling the relative amounts of the soft ferrite phase and the hard martensite and/or bainite phase and thereby ensuring a TS of 980 MPa or a higher degree of strength and formability. More specifically, an average cooling rate exceeding 30° C./second inhibits formation of ferrite during the cooling process and causes formation of the martensite phase to be excessively large, making it easy to ensure a TS as high as 980 MPa but at the same time leading to a reduced formability and impaired fatigue properties. When it is slower than 1° C./second, however, formation of the ferrite phase during the cooling process will be large, and pearlite will also increase, making it impossible to ensure TS. This average cooling rate is preferably 5 to 20° C./second.

In addition, the cooling method used here is preferably gas cooling. However, combinations of furnace cooling, mist cooling, roller cooling, water cooling, and other appropriate cooling techniques are also acceptable.

Cooling Stop Temperature: 450 to 550° C.

When the cooling stop temperature is higher than 550° C., austenite turns into pearlite or bainite, both of which are softer than the martensite phase, and this makes it difficult to ensure a TS as high as 980 MPa. Furthermore, formation of a hard retained austenite phase leads to a reduced stretch flangeability. When the cooling stop temperature is lower than 450° C., however, bainite transformation proceeds to increase retained austenite, making it difficult to ensure a TS as high as 980 MPa and leading to a reduced stretch flangeability.

After completion of the cooling process described above, the steel sheet is galvanized by an ordinary galvanization process. After being galvanized as above, the steel sheet is optionally alloyed by reheating with an induction heater or the like to be an alloyed galvanized steel sheet.

Zinc Coating Weight: 20 to 150 g/m² Per Side

The zinc coating weight should be approximately 20 to 150 g/m² per side. This is because it is difficult to ensure corrosion resistance when this zinc coating weight is smaller than 20 g/m², and a zinc coating weight exceeding 150 g/m² does not bring about a correspondingly greater effect but leads to an increased cost.

After being continuously annealed, the finished galvanized steel sheet may be subjected to temper rolling for the purposes of correcting its shape and adjusting its surface roughness. However, an excessive degree of skin-pass rolling causes introduction of an excessive amount of strain and elongation of grains, from which a rolled microstructure results, leading to a reduced elongation. Thus, the skin-pass rolling reduction is preferably on the order of 0.1 to 1.5%.

EXAMPLE 1

The steels having the compositions specified in Table 1 were cast into ingots and shaped into slabs, and the obtained slabs were then hot-rolled, pickled, cold-rolled with a rolling reduction: 50%, continuously annealed, and galvanized under the sets of conditions specified in Table 2. In this way, galvanized steel sheets and alloyed galvanized steel sheets each having a thickness of 1.4 mm and a coating weighing 45 g/m² per side were produced.

The obtained galvanized steel sheets and alloyed galvanized steel sheets were subjected to the material tests described below and examined on their material characteristics. The obtained results are shown in Table 3.

The material tests and methods for evaluating material characteristics were as follows.

(1) Microstructure of the Steel Sheet

Evaluations were made by observing a cross-section taken in the rolling direction at a planar position corresponding to a thickness: ¼, under an optical microscope or a scanning electron microscope (SEM). As for the grain diameter of the ferrite phase, the apparent grain size was measured in accordance with JIS G 0552 and then converted into an average grain diameter. As for the volume fraction of the ferrite phase and pearlite, ferrite and pearlite were identified by visual inspection on a cross-sectional microstructure image with a magnification: ×1000, the area occupied by the ferrite phase was determined in a randomly chosen square measuring 100 μm×100 μm, and the determined area was taken as the volume fraction of the ferrite phase and pearlite.

As for the content of retained austenite, each steel sheet was ground to the position corresponding to ¼ its thickness and then further polished by chemical milling by 0.1 mm, the integral intensity was measured on the obtained surface in an X-ray diffractometer using Kα radiation from Mo for (200), (220), and (311) planes of fcc iron and (200), (211), and (220) planes of bcc iron. The fraction of retained austenite was determined from these measurements.

The total content of bainite and martensite was derived from the portion excluding ferrite, austenite, and pearlite.

As for the average grain diameter of bainite and martensite, the apparent grain size was measured in accordance with JIS G 0552 with each continuous region composed of these two phases regarded as a grain, and then converted into an average grain diameter.

(2) Tensile Properties

Evaluations were made by performing the tensile test according to JIS Z 2241 using No. 5 test pieces described in JIS Z 2201, with their longitudinal direction (direction of elongation) at 90° to the rolling direction. The tensile properties were rated as good when the value of TS×El was equal to or larger than 13000 MPa·%.

(3) Hole Expansion Ratio

This test was performed in accordance with JFST1001 of the Japan Iron and Steel Federation. A hole was punched with the initial diameter $d_0$=10 mm, the hole was enlarged by lifting a 60° conical punch, the punch was stopped moving up at the time when a crack penetrated through the thickness, the diameter d of the perforation after the penetration of the crack was measured, and then the hole expansion ratio was calculated by the following equation:

Hole expansion ratio (%)=$((d-d_0)/d_0) \times 100$.

This test was performed in triplicate for each steel sheet No., and average hole expansion ratios values (λ) were determined. The hole expansion ratio was rated as good when the value of TS×λ was equal to or larger than 20000 MPa·%.

(4) Bending Limit

Measurements were made in accordance with the V-block bend method in JIS Z 2248. The bend was visually inspected from outside for any cracks, and the minimum bend radius achieved without causing no cracks was taken as the bend radius limit. The bend radius limit was rated as good when the measurement≤1.5t (t: thickness of the steel sheet) at a 90° V-shaped bend.

(5) Resistance Spot Weldability

First, spot welding was performed under the following conditions: electrodes: DR 6 mm—40R; pressure: 4802 N (490 kgf); squeeze time: 30 cycles/60 Hz; welding time: 17 cycles/60 Hz; holding time: 1 cycle/60 Hz. For each steel sheet No., the test current was varied from 4.6 to 10.0 kA in increments of 0.2 kA and from 10.0 kA to adhesion in increments of 0.5 kA. Each test piece was subjected to a cross-tension test and the measurement of the nugget diameter of its weld. The cross-tension test on resistance-spot-welded joints was performed in accordance with JIS Z 3137. As for nugget diameter, measurements were made as follows in accordance with JIS Z 3139. The symmetric circular plug left after the resistance spot welding process was cut halfway through by appropriate means along a cross-section perpendicular to the surface of the sheet to expose a cross-section near which the center of the weld was located. The obtained cross-section was polished and etched, and then the nugget diameter was measured by optical microscopic observations of the cross-sectional microstructure. The nugget diameter was defined as the maximum diameter of the fusion zone excluding corona. Weldability was rated as good when the cross-tension test on a welded sheet having a nugget diameter equal to or larger than $4t^{1/2}$ (mm) (t: thickness of the steel sheet) resulted in a fracture occurring at the base material.

(6) Bending Fatigue Test

The bending fatigue test was performed in accordance with JIS Z 2275, under the conditions of completely reversed stress (stress ratio −1) and a frequency of 20 Hz. The fatigue properties were rated as good when the endurance ratio≥0.42.

TABLE 1

| Steel | C | Si | Mn | P | S | Al | N | Cr | Ti | Nb | B | Mo | Ca | REM | Sb | Remarks |
|---|---|---|---|---|---|---|---|---|---|---|---|---|---|---|---|---|
| A | 0.092 | 0.38 | 2.51 | 0.014 | 0.0016 | 0.042 | 0.0035 | 0.25 | 0.024 | 0.038 | 0.0009 | — | — | — | — | Example |
| B | 0.082 | 0.42 | 2.46 | 0.015 | 0.0009 | 0.034 | 0.0028 | 0.15 | 0.021 | 0.051 | 0.0012 | — | — | — | — | Example |
| C | 0.098 | 0.48 | 2.61 | 0.009 | 0.0011 | 0.021 | 0.0030 | 0.09 | 0.032 | 0.046 | 0.0007 | — | — | — | — | Example |
| D | 0.112 | 0.45 | 2.08 | 0.006 | 0.0025 | 0.026 | 0.0032 | 0.35 | 0.035 | 0.063 | 0.0018 | — | — | — | — | Example |
| E | 0.075 | 0.52 | 2.76 | 0.008 | 0.0022 | 0.040 | 0.0024 | 0.41 | 0.051 | 0.022 | 0.0024 | — | — | — | — | Example |
| F | 0.063 | 0.71 | 2.97 | 0.023 | 0.0042 | 0.030 | 0.0036 | 0.20 | 0.012 | 0.071 | 0.0028 | — | — | — | — | Example |
| G | 0.087 | 0.55 | 2.76 | 0.030 | 0.0013 | 0.032 | 0.0029 | 0.30 | 0.018 | 0.028 | 0.0016 | — | — | — | — | Example |
| H | 0.109 | 0.53 | 2.15 | 0.025 | 0.0019 | 0.038 | 0.0039 | 0.28 | 0.042 | 0.034 | 0.0014 | — | — | — | — | Example |
| I | 0.103 | 0.64 | 2.43 | 0.036 | 0.0031 | 0.035 | 0.0025 | 0.11 | 0.045 | 0.042 | 0.0020 | — | — | — | — | Example |
| J | 0.094 | 0.39 | 2.46 | 0.007 | 0.0005 | 0.041 | 0.0028 | 0.18 | 0.029 | 0.044 | 0.0011 | 0.04 | — | — | — | Example |
| K | 0.044 | 0.54 | 2.11 | 0.015 | 0.0012 | 0.040 | 0.0024 | 0.22 | 0.029 | 0.056 | 0.0010 | — | — | — | — | Comp. Example |
| L | 0.128 | 0.39 | 2.22 | 0.017 | 0.0027 | 0.031 | 0.0029 | 0.19 | 0.034 | 0.071 | 0.0021 | — | — | — | — | Comp. Example |
| M | 0.094 | 0.11 | 2.76 | 0.028 | 0.0020 | 0.037 | 0.0022 | 0.33 | 0.016 | 0.049 | 0.0023 | — | — | — | — | Comp. Example |
| N | 0.086 | 0.97 | 2.49 | 0.026 | 0.0033 | 0.028 | 0.0029 | 0.45 | 0.022 | 0.032 | 0.0015 | — | — | — | — | Comp. Example |
| O | 0.073 | 0.50 | 1.91 | 0.031 | 0.0038 | 0.035 | 0.0030 | 0.47 | 0.041 | 0.028 | 0.0011 | — | — | — | — | Comp. Example |
| P | 0.105 | 0.61 | 3.62 | 0.037 | 0.0025 | 0.045 | 0.0020 | 0.32 | 0.050 | 0.046 | 0.0016 | — | — | — | — | Comp. Example |
| Q | 0.090 | 0.77 | 3.24 | 0.048 | 0.0016 | 0.033 | 0.0031 | 0.07 | 0.023 | 0.033 | 0.0008 | — | — | — | — | Comp. Example |
| R | 0.081 | 0.51 | 2.75 | 0.031 | 0.0062 | 0.026 | 0.0031 | 0.12 | 0.032 | 0.051 | 0.0016 | — | — | — | — | Comp. Example |
| S | 0.107 | 0.61 | 3.11 | 0.027 | 0.0019 | 0.12 | 0.0034 | 0.27 | 0.043 | 0.040 | 0.0022 | — | — | — | — | Comp. Example |
| T | 0.091 | 0.40 | 2.48 | 0.019 | 0.0013 | 0.031 | 0.0036 | 0.58 | 0.027 | 0.035 | 0.0014 | — | — | — | — | Comp. Example |
| U | 0.088 | 0.44 | 2.36 | 0.020 | 0.0025 | 0.043 | 0.0025 | 0.21 | 0.101 | 0.017 | 0.0023 | — | — | — | — | Comp. Example |
| V | 0.076 | 0.59 | 2.68 | 0.033 | 0.0024 | 0.044 | 0.0027 | 0.34 | 0.016 | 0.092 | 0.0007 | — | — | — | — | Comp. Example |
| W | 0.072 | 0.48 | 2.29 | 0.008 | 0.0032 | 0.022 | 0.0033 | 0.05 | 0.011 | 0.037 | — | — | — | — | — | Comp. Example |
| X | 0.095 | 0.44 | 2.36 | 0.007 | 0.0008 | 0.035 | 0.0027 | 0.16 | 0.022 | 0.033 | 0.0005 | — | 0.0018 | — | — | Example |
| Y | 0.093 | 0.40 | 2.54 | 0.008 | 0.0009 | 0.036 | 0.0027 | 0.19 | 0.025 | 0.034 | 0.0006 | — | — | 0.0030 | — | Example |
| Z | 0.089 | 0.64 | 2.72 | 0.010 | 0.0022 | 0.029 | 0.0033 | 0.23 | 0.033 | 0.025 | 0.0013 | — | — | — | 0.004 | Example |
| AA | 0.115 | 0.73 | 2.17 | 0.005 | 0.0008 | 0.075 | 0.0031 | 0.30 | 0.020 | 0.053 | 0.0021 | 0.02 | 0.0010 | — | — | Example |
| AB | 0.100 | 0.36 | 2.65 | 0.022 | 0.0010 | 0.090 | 0.0033 | 0.08 | 0.011 | 0.043 | 0.0013 | — | — | — | — | Example |

TABLE 2

| No. | Steel | Slab-heating temp. (° C.) | Finish rolling temp. (° C.) | Ave. rate of cooling from the finish temp. (° C./sec) | Coiling temp. (° C.) | 1st ave. heating rate (° C./sec) | Intermediate temp. (° C.) | 2nd ave. heating rate (° C./sec) |
|---|---|---|---|---|---|---|---|---|
| 1 | A | 1200 | 900 | 20 | 550 | 15 | 650 | 1.5 |
| 2 | A | 1000 | 900 | 20 | 550 | 15 | 650 | 1.5 |
| 3 | A | 1250 | 1000 | 20 | 550 | 15 | 650 | 1.5 |
| 4 | A | 1250 | 900 | 20 | 550 | 15 | 650 | 1.5 |
| 5 | B | 1170 | 920 | 10 | 450 | 12 | 680 | 1.2 |
| 6 | B | 1170 | 920 | 1 | 450 | 12 | 680 | 1.2 |
| 7 | C | 1230 | 940 | 30 | 500 | 20 | 620 | 1.0 |
| 8 | C | 1230 | 940 | 30 | 700 | 20 | 620 | 1.0 |
| 9 | D | 1200 | 890 | 50 | 600 | 15 | 550 | 2.0 |
| 10 | D | 1200 | 890 | 50 | 600 | 4 | 550 | 2.0 |
| 11 | E | 1220 | 880 | 100 | 520 | 30 | 600 | 5.0 |
| 12 | E | 1220 | 880 | 100 | 520 | 30 | 820 | 5.0 |
| 13 | F | 1240 | 860 | 70 | 580 | 25 | 700 | 15.0 |
| 14 | F | 1240 | 860 | 70 | 580 | 25 | 700 | 1.0 |
| 15 | F | 1240 | 860 | 70 | 580 | 25 | 700 | 0.01 |
| 16 | G | 1190 | 900 | 80 | 610 | 25 | 750 | 4.0 |
| 17 | G | 1190 | 900 | 80 | 610 | 25 | 750 | 4.0 |
| 18 | G | 1190 | 900 | 80 | 610 | 25 | 750 | 4.0 |
| 19 | H | 1160 | 870 | 20 | 480 | 10 | 600 | 0.5 |
| 20 | H | 1160 | 870 | 20 | 480 | 10 | 600 | 0.5 |
| 21 | H | 1160 | 870 | 20 | 480 | 10 | 600 | 0.5 |
| 22 | H | 1160 | 870 | 20 | 480 | 6 | 600 | 0.5 |
| 23 | I | 1230 | 920 | 30 | 530 | 40 | 700 | 2.5 |
| 24 | I | 1230 | 920 | 30 | 530 | 40 | 700 | 2.5 |
| 25 | I | 1230 | 920 | 30 | 530 | 40 | 700 | 2.5 |
| 26 | J | 1250 | 910 | 70 | 630 | 20 | 680 | 0.7 |
| 27 | J | 1250 | 910 | 70 | 630 | 20 | 680 | 0.7 |
| 28 | J | 1250 | 910 | 70 | 630 | 20 | 680 | 0.7 |
| 29 | K | 1200 | 900 | 50 | 550 | 30 | 700 | 5.0 |
| 30 | L | 1200 | 890 | 60 | 550 | 35 | 680 | 2.0 |
| 31 | M | 1230 | 920 | 100 | 600 | 15 | 650 | 3.0 |
| 32 | N | 1220 | 910 | 40 | 620 | 12 | 580 | 1.0 |
| 33 | O | 1210 | 880 | 30 | 630 | 10 | 550 | 1.5 |
| 34 | P | 1160 | 860 | 50 | 620 | 25 | 620 | 1.2 |
| 35 | Q | 1170 | 920 | 80 | 570 | 25 | 600 | 0.5 |
| 36 | R | 1200 | 900 | 100 | 540 | 30 | 700 | 7.0 |
| 37 | S | 1230 | 930 | 60 | 560 | 15 | 750 | 0.7 |

TABLE 2-continued

| No. | | Annealing temp. (°C.) | Holding time (sec) | Ave. cooling rate (°C./sec) | Cooling stop temp. (°C.) | Alloying | Skin pass (%) | Remarks |
|---|---|---|---|---|---|---|---|---|
| 38 | T̲ | 1230 | 890 | 40 | 590 | 10 | 780 | 2.0 |
| 39 | U̲ | 1230 | 870 | 30 | 500 | 15 | 600 | 1.0 |
| 40 | V̲ | 1200 | 900 | 50 | 480 | 20 | 620 | 0.7 |
| 41 | W̲ | 1180 | 860 | 80 | 470 | 20 | 570 | 3.0 |
| 42 | X̲ | 1230 | 900 | 35 | 480 | 18 | 650 | 1.0 |
| 43 | Y | 1180 | 920 | 45 | 500 | 20 | 600 | 0.7 |
| 44 | Z | 1240 | 910 | 75 | 550 | 15 | 680 | 0.5 |
| 45 | AA | 1200 | 930 | 25 | 520 | 12 | 700 | 0.3 |
| 46 | AB | 1160 | 940 | 15 | 600 | 15 | 620 | 0.7 |

| No. | Annealing temp. (°C.) | Holding time (sec) | Ave. cooling rate (°C./sec) | Cooling stop temp. (°C.) | Alloying | Skin pass (%) | Remarks |
|---|---|---|---|---|---|---|---|
| 1 | 820 | 90 | 10 | 480 | Yes | 0.3 | Example |
| 2 | 820 | 90 | 10 | 480 | Yes | 0.3 | Comp. Example |
| 3 | 820 | 90 | 10 | 480 | Yes | 0.3 | Comp. Example |
| 4 | 820 | 90 | 10 | 480 | Yes | 0.3 | Example |
| 5 | 800 | 120 | 15 | 500 | Yes | 0.3 | Example |
| 6 | 800 | 120 | 15 | 500 | Yes | 0.3 | Comp. Example |
| 7 | 780 | 60 | 20 | 520 | Yes | 0.1 | Example |
| 8 | 780 | 60 | 20 | 520 | Yes | 0.1 | Comp. Example |
| 9 | 840 | 100 | 5 | 540 | Yes | 0.3 | Example |
| 10 | 840 | 100 | 5 | 540 | Yes | 0.3 | Comp. Example |
| 11 | 880 | 300 | 15 | 470 | No | 0.3 | Example |
| 12 | 880 | 300 | 15 | 470 | No | 0.3 | Comp. Example |
| 13 | 760 | 20 | 12 | 470 | Yes | 0.3 | Comp. Example |
| 14 | 760 | 20 | 12 | 500 | Yes | 0.3 | Example |
| 15 | 760 | 20 | 12 | 500 | Yes | 0.3 | Comp. Example |
| 16 | 950̲ | 90 | 7 | 460 | Yes | 0.5 | Comp. Example |
| 17 | 800 | 90 | 7 | 460 | Yes | 0.5 | Example |
| 18 | 720̲ | 90 | 7 | 460 | Yes | 0.3 | Comp. Example |
| 19 | 800 | 600̲ | 15 | 510 | Yes | 0.3 | Comp. Example |
| 20 | 800 | 60 | 15 | 510 | Yes | 0.3 | Example |
| 21 | 800 | 3̲ | 15 | 510 | Yes | 0.3 | Comp. Example |
| 22 | 800 | 3̲ | 15 | 510 | Yes | 0.3 | Example |
| 23 | 840 | 150 | 50̲ | 490 | Yes | 0.7 | Comp. Example |
| 24 | 840 | 150 | 10 | 490 | Yes | 0.7 | Example |
| 25 | 840 | 150 | 0.1̲ | 490 | Yes | 0.7 | Comp. Example |
| 26 | 770 | 200 | 10 | 600̲ | Yes | 0.3 | Comp. Example |
| 27 | 770 | 200 | 10 | 500 | Yes | 0.3 | Example |
| 28 | 770 | 200 | 10 | 400̲ | Yes | 0.3 | Comp. Example |
| 29 | 800 | 180 | 10 | 470 | Yes | 0.3 | Comp. Example |
| 30 | 780 | 90 | 12 | 500 | Yes | 0.3 | Comp. Example |
| 31 | 860 | 60 | 5 | 460 | Yes | 0.3 | Comp. Example |
| 32 | 900 | 40 | 7 | 460 | Yes | 0.3 | Comp. Example |
| 33 | 880 | 30 | 25 | 520 | Yes | 0.3 | Comp. Example |
| 34 | 790 | 30 | 30 | 540 | Yes | 0.3 | Comp. Example |
| 35 | 860 | 90 | 20 | 460 | Yes | 0.3 | Comp. Example |
| 36 | 820 | 100 | 15 | 490 | Yes | 0.3 | Comp. Example |
| 37 | 810 | 150 | 12 | 500 | Yes | 0.3 | Comp. Example |
| 38 | 760 | 90 | 7 | 510 | Yes | 0.3 | Comp. Example |
| 39 | 790 | 60 | 20 | 530 | Yes | 0.3 | Comp. Example |
| 40 | 800 | 150 | 10 | 480 | Yes | 0.3 | Comp. Example |
| 41 | 830 | 120 | 12 | 470 | Yes | 0.3 | Comp. Example |
| 42 | 750 | 50 | 12 | 520 | Yes | 0.3 | Example |
| 43 | 800 | 100 | 20 | 480 | Yes | 0.5 | Example |
| 44 | 780 | 60 | 15 | 500 | Yes | 0.2 | Example |
| 45 | 820 | 120 | 7 | 510 | Yes | 0.3 | Example |
| 46 | 840 | 180 | 10 | 490 | Yes | 0.3 | Example |

TABLE 3

| | | Steel sheet microstructure | | | | | Material characteristics | | | | | |
|---|---|---|---|---|---|---|---|---|---|---|---|---|
| | | Ferrite phase | | Bainite and/or martensite phase | | Balance* | | | | | | |
| No | Steel | Ave. grain dia. (mm) | Vol. fraction (%) | Ave. grain dia. (mm) | Vol. fraction (%) | Vol. fraction (%) | YP (MPa) | TS (MPa) | El (%) | λ (%) | TS′·El (MPa × %) | TS′·λ (MPa × %) |
| 1 | A | 3.5 | 48 | 3.1 | 51 | 1 (g) | 714 | 1072 | 14.3 | 34 | 15330 | 36448 |
| 2 | A | 6.7 | 46 | 6.4 | 52 | 2 (g) | 705 | 1067 | 11.4 | 17 | 12164 | 18139 |

TABLE 3-continued

| No | Steel | Ferrite phase Ave. grain dia. (mm) | Ferrite phase Vol. fraction (%) | Bainite and/or martensite phase Ave. grain dia. (mm) | Bainite and/or martensite phase Vol. fraction (%) | Balance* Vol. fraction (%) | YP (MPa) | TS (MPa) | El (%) | λ (%) | TS·El (MPa×%) | TS·λ (MPa×%) |
|---|---|---|---|---|---|---|---|---|---|---|---|---|
| 3 | A | 7.2 | 41 | 8.3 | 58 | 1 (g) | 729 | 1093 | 9.6 | 16 | 10493 | 17488 |
| 4 | A | 3.2 | 49 | 2.8 | 50 | 1 (g) | 713 | 1064 | 14.2 | 33 | 15109 | 35112 |
| 5 | B | 3.3 | 54 | 2.6 | 46 | 0 | 692 | 1016 | 15.3 | 35 | 15545 | 35560 |
| 6 | B | 5.8 | 56 | 5.5 | 43 | 1 (g) | 668 | 997 | 12.2 | 23 | 12163 | 22931 |
| 7 | C | 2.3 | 47 | 1.9 | 51 | 2 (g) | 700 | 1057 | 14.3 | 35 | 15115 | 36995 |
| 8 | C | 6.1 | 45 | 4.2 | 53 | 2 (g) | 718 | 1071 | 11.1 | 29 | 11888 | 31059 |
| 9 | D | 3.4 | 48 | 3.0 | 51 | 1 (g) | 652 | 1039 | 13.2 | 26 | 13715 | 27014 |
| 10 | D | 6.6 | 46 | 5.2 | 54 | 0 | 667 | 1052 | 11.2 | 18 | 11782 | 18936 |
| 11 | E | 3.5 | 62 | 2.9 | 37 | 1 (g) | 693 | 986 | 14.1 | 28 | 13903 | 27608 |
| 12 | E | 5.9 | 58 | 4.5 | 41 | 1 (g) | 692 | 995 | 12.7 | 25 | 12637 | 24875 |
| 13 | F | 3.7 | 75 | 4.2 | 25 | 0 | 653 | 961 | 16.4 | 27 | 15760 | 25947 |
| 14 | F | 4.2 | 64 | 4.5 | 36 | 0 | 684 | 985 | 13.4 | 25 | 13199 | 24625 |
| 15 | F | 5.8 | 58 | 5.5 | 42 | 0 | 687 | 1003 | 12.7 | 27 | 12738 | 27081 |
| 16 | G | 6.4 | 32 | 6.9 | 68 | 0 | 752 | 1092 | 9.6 | 41 | 10483 | 44772 |
| 17 | G | 3.6 | 56 | 3.1 | 44 | 0 | 703 | 1022 | 13.2 | 29 | 13490 | 29638 |
| 18 | G | 7.2 | 85 | 1.5 | 12 | 3 (P) | 646 | 892 | 16.7 | 32 | 14896 | 28544 |
| 19 | H | 5.9 | 33 | 6.8 | 67 | 0 | 761 | 1109 | 10.7 | 18 | 11866 | 19962 |
| 20 | H | 3.5 | 42 | 3.2 | 57 | 1 (g) | 723 | 1046 | 13.6 | 22 | 14226 | 23012 |
| 21 | H | 6.8 | 75 | 1.9 | 19 | 6 (P) | 659 | 952 | 17.4 | 20 | 16565 | 19040 |
| 22 | H | 4.5 | 40 | 4.7 | 60 | 0 | 694 | 1053 | 14.2 | 20 | 14953 | 21060 |

| No | Bending limit (mm) | Bending limit(mm)/ thickness (mm) | Resistance spot weldability | Fatigue limit ratio** | Remarks |
|---|---|---|---|---|---|
| 1 | 1.5 | 1.1 | Fracture at base material | 0.45 | Example |
| 2 | 3.0 | 2.1 | Fracture at base material | 0.37 | Comp. Example |
| 3 | 3.5 | 2.5 | Fracture at base material | 0.39 | Comp. Example |
| 4 | 1.5 | 1.1 | Fracture at base material | 0.44 | Example |
| 5 | 1.5 | 1.1 | Fracture at base material | 0.45 | Example |
| 6 | 2.5 | 1.8 | Fracture at base material | 0.43 | Comp. Example |
| 7 | 1.5 | 1.1 | Fracture at base material | 0.44 | Example |
| 8 | 2.0 | 1.4 | Fracture at base material | 0.40 | Comp. Example |
| 9 | 2.0 | 1.4 | Fracture at base material | 0.42 | Example |
| 10 | 3.0 | 2.1 | Fracture at base material | 0.40 | Comp. Example |
| 11 | 1.5 | 1.1 | Fracture at base material | 0.43 | Example |
| 12 | 2.5 | 1.8 | Fracture at base material | 0.41 | Comp. Example |
| 13 | 1.5 | 1.1 | Fracture at base material | 0.44 | Comp. Example |
| 14 | 2.0 | 1.4 | Fracture at base material | 0.43 | Example |
| 15 | 2.5 | 1.8 | Fracture at base material | 0.41 | Comp. Example |
| 16 | 4.0 | 2.9 | Fracture at base material | 0.40 | Comp. Example |
| 17 | 2.0 | 1.4 | Fracture at base material | 0.42 | Example |
| 18 | 2.5 | 1.8 | Fracture at base material | 0.41 | Comp. Example |
| 19 | 2.5 | 1.8 | Fracture at base material | 0.39 | Comp. Example |
| 20 | 1.5 | 1.1 | Fracture at base material | 0.44 | Example |
| 21 | 2.0 | 1.4 | Fracture at base material | 0.42 | Comp. Example |
| 22 | 2.0 | 1.4 | Fracture at base material | 0.43 | Example |

| No | Steel | Ferrite phase Ave. grain dia. (mm) | Ferrite phase Vol. fraction (%) | Bainite and/or martensite phase Ave. grain dia. (mm) | Bainite and/or martensite phase Vol. fraction (%) | Balance* Vol. fraction (%) | YP (MPa) | TS (MPa) | El (%) | λ (%) | TS·El (MPa×%) | TS·λ (MPa×%) |
|---|---|---|---|---|---|---|---|---|---|---|---|---|
| 23 | I | 3.6 | 13 | 8.3 | 86 | 1 (g) | 782 | 1169 | 10.5 | 42 | 12275 | 49098 |
| 24 | I | 3.2 | 44 | 3.6 | 54 | 2 (g) | 736 | 1077 | 13.5 | 23 | 14540 | 24771 |
| 25 | I | 7.3 | 67 | 6.7 | 21 | 12 (P) | 622 | 873 | 17.6 | 24 | 15365 | 20952 |
| 26 | J | 3.7 | 54 | 3.6 | 29 | 17 (P) | 613 | 905 | 15.4 | 22 | 13937 | 19910 |
| 27 | J | 3.2 | 57 | 2.7 | 42 | 1 (g) | 699 | 1026 | 15.1 | 32 | 15493 | 32832 |
| 28 | J | 3.3 | 66 | 3.1 | 27 | 7 (g) | 638 | 942 | 19.6 | 15 | 18463 | 14130 |
| 29 | *K* | 2.7 | 74 | 2.4 | 25 | 1 (g) | 621 | 925 | 17.6 | 30 | 16280 | 27750 |
| 30 | *L* | 3.3 | 43 | 2.9 | 52 | 5 (g) | 834 | 1231 | 12.4 | 25 | 15264 | 30775 |
| 31 | *M* | 3.9 | 42 | 3.2 | 56 | 2 (g) | 702 | 1037 | 15.4 | 24 | 15970 | 24888 |
| 32 | *N* | 4.1 | 44 | 3.6 | 51 | 5 (g) | 654 | 1064 | 16.5 | 20 | 17556 | 21280 |
| 33 | *O* | 2.8 | 72 | 2.1 | 28 | 0 | 603 | 964 | 16.9 | 35 | 16292 | 33740 |
| 34 | *P* | 3.1 | 35 | 2.4 | 63 | 2 (g) | 754 | 1186 | 12.8 | 25 | 15181 | 29650 |
| 35 | *Q* | 3.4 | 40 | 2.5 | 58 | 2 (g) | 726 | 1079 | 14.5 | 24 | 15646 | 25896 |
| 36 | *R* | 4.6 | 52 | 3.8 | 47 | 1 (g) | 638 | 1020 | 15.3 | 15 | 15606 | 15300 |
| 37 | *S* | 3.8 | 42 | 3.2 | 55 | 3 (g) | 746 | 1149 | 13.5 | 24 | 15512 | 27576 |
| 38 | *T* | 3.4 | 41 | 3.1 | 58 | 1 (g) | 685 | 1072 | 14.3 | 20 | 15330 | 21440 |
| 39 | *U* | 2.1 | 55 | 3.4 | 45 | 0 | 765 | 1002 | 11.4 | 22 | 11423 | 22044 |

TABLE 3-continued

| 40 | V  | 1.8 | 50 | 1.4 | 50 | 0    | 809 | 1056 | 10.5 | 32 | 11088 | 33792 |
| 41 | W  | 3.1 | 75 | 2.5 | 24 | 1 (g)| 667 | 946  | 15.1 | 26 | 14285 | 24596 |
| 42 | X  | 3.2 | 53 | 2.9 | 47 | 0    | 665 | 996  | 16.3 | 39 | 16235 | 38844 |
| 43 | Y  | 3.1 | 46 | 2.9 | 51 | 3 (g)| 683 | 1051 | 14.7 | 37 | 15450 | 38887 |
| 44 | Z  | 4.3 | 49 | 3.1 | 49 | 2 (g)| 718 | 1039 | 15.3 | 32 | 15897 | 33248 |
| 45 | AA | 2.9 | 44 | 2.6 | 53 | 3 (g)| 735 | 1120 | 15.0 | 35 | 16800 | 39200 |
| 46 | AB | 3.6 | 41 | 3.3 | 58 | 1 (g)| 708 | 1133 | 14.1 | 28 | 15975 | 31724 |

| | | Material characteristics | | | |
|---|---|---|---|---|---|
| No | Bending limit. (mm) | Bending limit(mm)/ thickness (mm) | Resistance spot weldability | Endurance ratio** | Remarks |
| 23 | 2.0 | 1.4 | Fracture at base material | 0.38 | Comp. Example |
| 24 | 2.0 | 1.4 | Fracture at base material | 0.43 | Example |
| 25 | 2.5 | 1.8 | Fracture at base material | 0.39 | Comp. Example |
| 26 | 2.5 | 1.8 | Fracture at base material | 0.40 | Comp. Example |
| 27 | 1.5 | 1.1 | Fracture at base material | 0.44 | Example |
| 28 | 3.0 | 2.1 | Fracture at base material | 0.45 | Comp. Example |
| 29 | 1.5 | 1.1 | Fracture at base material | 0.44 | Comp. Example |
| 30 | 3.0 | 2.1 | Fracture in nugget | 0.43 | Comp. Example |
| 31 | 3.0 | 2.1 | Fracture at base material | 0.40 | Comp. Example |
| 32 | 2.0 | 1.4 | Fracture at base material | 0.35 | Comp. Example |
| 33 | 2.0 | 1.4 | Fracture at base material | 0.47 | Comp. Example |
| 34 | 3.0 | 2.1 | Fracture at base material | 0.43 | Comp. Example |
| 35 | 2.5 | 1.8 | Fracture in nugget | 0.42 | Comp. Example |
| 36 | 2.0 | 1.4 | Fracture at base material | 0.44 | Comp. Example |
| 37 | 1.5 | 1.1 | Fracture in nugget | 0.42 | Comp. Example |
| 38 | 0.5 | 0.4 | Fracture at base material | 0.41 | Comp. Example |
| 39 | 2.0 | 1.4 | Fracture at base material | 0.45 | Comp. Example |
| 40 | 1.5 | 1.1 | Fracture at base material | 0.46 | Comp. Example |
| 41 | 2.5 | 1.8 | Fracture at base material | 0.44 | Comp. Example |
| 42 | 1.5 | 1.1 | Fracture at base material | 0.44 | Example |
| 43 | 1.5 | 1.1 | Fracture at base material | 0.44 | Example |
| 44 | 2.0 | 1.4 | Fracture at base material | 0.43 | Example |
| 45 | 2.0 | 1.4 | Fracture at base material | 0.42 | Example |
| 46 | 2.0 | 1.4 | Fracture at base material | 0.44 | Example |

*For Balance, the letter in the parentheses represents the kind of phase: retained austenite: g; pearlite: P.
**Endurance ratio = Fatigue limit/TS As can be seen from Table 3, Example Nos. 1, 4, 5, 7, 9, 11, 14, 17, 20, 22, 24, 27, and 42 to 46, which are our examples, provided high strength galvanized steel sheets having excellent formability, satisfying all of the following: a tensile strength TS of not less than 980 MPa; TS×El≥13000 MPa·%; TS×λ≥20000 MPa·%; the bend radius limit at a 90° V-shaped bend 1.5t (t: thickness; for these examples, t=1.4 mm and 1.5t=2.1); a good resistance spot weldability (a fracture at the base material); good fatigue properties (endurance ratio≥0.42).

On the other hand, Comparative Example Nos. 2, 3, 6, 8, 10, 12, 13, 15, 16, 18, 19, 21, 23, 25, 26, and 28 to 41 were inferior in one or more of the material characteristics described above.

Of these, Nos. 2, 3, 6, 8, 10, 12, 13, 15, 16, 18, 19, 21, 23, 25, 26, and 28 had compositions falling within our compositions, but were manufactured under conditions different from our conditions. For example, Nos. 2 and 3 were produced with a slab-heating temperature and a finish rolling temperature respectively deviating from our range and had an average grain diameter of the ferrite phase exceeding our range; their TS was higher than 980 MPa, but TS×El, TS×λ, the bend radius limit at a 90° V-shaped bend, and fatigue properties were all outside acceptance criteria. Nos. 13 and 18 were produced with a second average heating rate and an annealing temperature respectively deviating from our range and contained a ferrite phase at a volume fraction exceeding our upper limit; these steel sheets were soft with the TS lower than 980 MPa, falling outside acceptance criteria.

Furthermore, Nos. 29 to 41 had compositions outside our range. For example, Nos. 30, 35, and 37 contained C, P, and Al, respectively, in an amount exceeding our range; their weldability was outside the acceptance criteria. As for No. 32, the content of Si exceeded our range; its fatigue properties (endurance ratio) were outside the acceptance criteria.

As can be seen from Table 3, our examples provided high strength galvanized steel sheets having excellent formability, satisfying all of the following: TS×El≥13000 MPa·%; TS×λ≥20000 MPa·%; the bend radius limit at a 90° V-shaped bend≤1.5t (t: thickness of the steel sheet); a good resistance spot weldability; good fatigue properties.

INDUSTRIAL APPLICABILITY

The high strength galvanized steel sheet has not only a high tensile strength but also excellent formability, weldability, and fatigue properties and thus can be suitably used in automobile components as well as in other applications requiring strict dimensional precision, formability, and endurance under heavy-stress conditions such as the fields of building and home appliances.

The invention claimed is:
1. A high strength galvanized steel sheet having excellent formability, weldability, and fatigue properties, comprising: a composition of C: 0.05% to <0.12%, Si: 0.35% to <0.80%, Mn: 2.0 to 3.5%, P: 0.001 to 0.040%, S: 0.0001 to 0.0050%, Al: 0.005 to 0.1%, N: 0.0001 to 0.0060%, Cr: 0.01% to 0.41%, Ti: 0.010 to 0.080%, Nb: 0.010 to 0.080%, B: 0.0001 to 0.0030%, Ni: <0.04% and Mo: <0.05% all in mass %, and

Fe and an unavoidable impurity as the balance; a microstructure comprising a recrystallized ferrite phase with a volume fraction of 20 to 70% and an average grain diameter equal to or smaller than 5 μm; a tensile strength equal to or higher than 980 MPa; an endurance ratio of 0.42 or more; and a galvanized layer on a surface thereof at a coating weight (per side): 20 to 150 g/m².

2. The high strength galvanized steel sheet according to claim 1, wherein Mo is only present as an unavoidable impurity.

3. The high strength galvanized steel sheet according to claim 2, further comprising Ca: 0.0001 to 0.0050% and/or REM: 0.0001 to 0.1% both in mass %.

4. The high strength galvanized steel sheet according to claim 2, further comprising Sb: 0.0001 to 0.1% in mass %.

5. A method of manufacturing a high strength galvanized steel sheet having excellent formability, weldability, and fatigue properties having the composition according to claim 2, comprising:
    hot-rolling a slab at a slab-heating temperature of 1150 to 1300° C. and a finish hot-rolling temperature of 850 to 950° C. and then cooling down in a temperature range from the finish hot-rolling temperature to (the finish hot-rolling temperature—100° C.) at an average cooling rate: 5 to 200° C./second;
    coiling the hot-rolled steel sheet at a temperature of 400 to 650° C.;
    pickling the hot-rolled steel sheet;
    cold rolling the pickled hot-rolled steel sheet;
    heating the cold-rolled steel sheet to an intermediate temperature of 500 to 800° C. at a first average heating rate, the heating rate for heating from 200° C. to the intermediate temperature, in a range of 5 to 50° C./second, further heating to an annealing temperature of 730 to 900° C. at a second average heating rate, the heating rate for heating from the intermediate temperature to the annealing temperature of 0.1 to 10° C./second, holding in this annealing temperature range for 10 to 500 seconds, and then cooling to a temperature of 450 to 550° C. at an average cooling rate of 1 to 30° C./second;
    galvanizing the steel sheet; and
    optionally, alloying the galvanized steel sheet.

6. The high strength galvanized steel sheet according to claim 1, further comprising Ca: 0.0001 to 0.0050% and/or REM: 0.0001 to 0.1% both in mass %.

7. The high strength galvanized steel sheet according to claim 6, further comprising Sb: 0.0001 to 0.1% in mass %.

8. A method of manufacturing a high strength galvanized steel sheet having excellent formability, weldability, and fatigue properties having the composition according to claim 6, comprising:
    hot-rolling a slab at a slab-heating temperature of 1150 to 1300° C. and a finish hot-rolling temperature of 850 to 950° C. and then cooling down in a temperature range from the finish hot-rolling temperature to (the finish hot-rolling temperature—100° C.) at an average cooling rate: 5 to 200° C./second;
    coiling the hot-rolled steel sheet at a temperature of 400 to 650° C.;
    pickling the hot-rolled steel sheet;
    cold rolling the pickled hot-rolled steel sheet;
    heating the cold-rolled steel sheet to an intermediate temperature of 500 to 800° C. at a first average heating rate, the heating rate for heating from 200° C. to the intermediate temperature, in a range of 5 to 50° C./second, further heating to an annealing temperature of 730 to 900° C. at a second average heating rate, the heating rate for heating from the intermediate temperature to the annealing temperature of 0.1 to 10° C./second, holding in this annealing temperature range for 10 to 500 seconds, and then cooling to a temperature of 450 to 550° C. at an average cooling rate of 1 to 30° C./second;
    galvanizing the steel sheet; and
    optionally, alloying the galvanized steel sheet.

9. The high strength galvanized steel sheet according to claim 1, further comprising Sb: 0.0001 to 0.1% in mass %.

10. A method of manufacturing a high strength galvanized steel sheet having excellent formability, weldability, and fatigue properties having the composition according to claim 9, comprising:
    hot-rolling a slab at a slab-heating temperature of 1150 to 1300° C. and a finish hot-rolling temperature of 850 to 950° C. and then cooling down in a temperature range from the finish hot-rolling temperature to (the finish hot-rolling temperature—100° C.) at an average cooling rate: 5 to 200° C./second;
    coiling the hot-rolled steel sheet at a temperature of 400 to 650° C.;
    pickling the hot-rolled steel sheet;
    cold rolling the pickled hot-rolled steel sheet;
    heating the cold-rolled steel sheet to an intermediate temperature of 500 to 800° C. at a first average heating rate, the heating rate for heating from 200° C. to the intermediate temperature, in a range of 5 to 50° C./second, further heating to an annealing temperature of 730 to 900° C. at a second average heating rate, the heating rate for heating from the intermediate temperature to the annealing temperature of 0.1 to 0° C./second, holding in this annealing temperature range for 10 to 500 seconds, and then cooling to a temperature of 450 to 550° C. at an average cooling rate of 1 to 30° C./second;
    galvanizing the steel sheet; and
    optionally, alloying the galvanized steel sheet.

11. The high strength galvanized steel sheet according to claim 1, wherein Cr is present in an amount of 0.01% to 0.30%.

12. A method of manufacturing a high strength galvanized steel sheet having excellent formability, weldability, and fatigue properties having the composition according to claim 1, comprising:
    hot-rolling a slab at a slab-heating temperature of 1150 to 1300° C. and a finish hot-rolling temperature of 850 to 950° C. and then cooling down in a temperature range from the finish hot-rolling temperature to (the finish hot-rolling temperature—100° C.) at an average cooling rate: 5 to 200° C./second;
    coiling the hot-rolled steel sheet at a temperature of 400 to 650° C.;
    pickling the hot-rolled steel sheet;
    cold rolling the pickled hot-rolled steel sheet;
    heating the cold-rolled steel sheet to an intermediate temperature of 500 to 800° C. at a first average heating rate, the heating rate for heating from 200° C. to the intermediate temperature, in a range of 5 to 50° C./second, further heating to an annealing temperature of 730 to 900° C. at a second average heating rate, the heating rate for heating from the intermediate temperature to the annealing temperature of 0.1 to 10° C./second, holding in this annealing temperature range for 10 to 500 seconds, and then cooling to a temperature of 450 to 550° C. at an average cooling rate of 1 to 30° C./second;
    galvanizing the steel sheet; and
    optionally, alloying the galvanized steel sheet.

13. A high strength galvanized steel sheet having excellent formability, weldability, and fatigue properties, comprising: a composition of C: 0.05% to <0.12%, Si: 0.35% to <0.80%, Mn: 2.0 to 3.5%, P: 0.001 to 0.040%, S: 0.0001 to 0.0050%, Al: 0.005 to 0.1%, N: 0.0001 to 0.0060%, Cr: 0.01% to 0.41%, Ti: 0.010 to 0.080%, Nb: 0.010 to 0.080%, B: 0.0001 to 0.0030%, Ni: <0.04% and Mo: <0.05% all in mass %, and Fe and an unavoidable impurity as the balance; a microstructure comprising a recrystallized ferrite phase with a volume fraction of 20 to 70% having an average grain diameter equal to or smaller than 5 μm, retained austenite and pearlite at a total of 5% or less, and bainite and/or martensite having an average grain diameter equal to or smaller than 5 μm; a tensile strength equal to or higher than 980 MPa; an endurance ratio of 0.42 or more; and a galvanized layer on a surface thereof at a coating weight (per side): 20 to 150 g/m$^2$.

14. The high strength galvanized steel sheet according to claim 13, further comprising Mo: 0.01 to 0.15% in mass %.

15. The high strength galvanized steel sheet according to claim 13, further comprising Ca: 0.0001 to 0.0050% and/or REM: 0.0001 to 0.1% both in mass %.

16. The high strength galvanized steel sheet according to claim 13, further comprising Sb: 0.0001 to 0.1% in mass %.

17. The high strength galvanized steel sheet according to claim 13, wherein Cr is present in an amount of 0.01% to 0.30%.

18. A method of manufacturing a high strength galvanized steel sheet having excellent formability, weldability, and fatigue properties having the composition according to claim 13, comprising:
hot-rolling a slab at a slab-heating temperature of 1150 to 1300° C. and a finish hot-rolling temperature of 850 to 950° C. and then cooling down in a temperature range from the finish hot-rolling temperature to (the finish hot-rolling temperature—100° C.) at an average cooling rate: 5 to 200° C./second;
coiling the hot-rolled steel sheet at a temperature of 400 to 650° C.;
pickling the hot-rolled steel sheet;
cold rolling the pickled hot-rolled steel sheet;
heating the cold-rolled steel sheet to an intermediate temperature of 500 to 800° C. at a first average heating rate, the heating rate for heating from 200° C. to the intermediate temperature, in a range of 5 to 50° C./second, further heating to an annealing temperature of 730 to 900° C. at a second average heating rate, the heating rate for heating from the intermediate temperature to the annealing temperature of 0.1 to 10° C./second, holding in this annealing temperature range for 10 to 500 seconds, and then cooling to a temperature of 450 to 550° C. at an average cooling rate of 1 to 30° C./second;
galvanizing the steel sheet; and
optionally, alloying the galvanized steel sheet.

* * * * *